(12) United States Patent
Minei et al.

(10) Patent No.: US 10,676,059 B2
(45) Date of Patent: Jun. 9, 2020

(54) AIRBAG

(71) Applicants: TOYOTA JIDOSHA KABUSHIKI KAISHA, Toyota-cho (JP); Autoliv Development AB, Vargarda (SE)

(72) Inventors: Taichi Minei, Toyota (JP); Kenichiro Yoshimoto, Toyota (JP); Shunichi Okinaka, Tsuchiura (JP); Xiang Chen, Kasumigaura (JP)

(73) Assignees: TOYOTA JIDOSHA KABUSHIKI KAISHA, Toyota-shi (JP); Autoliv Development AB, Vargarda (SE)

( * ) Notice: Subject to any disclaimer, the term of this patent is extended or adjusted under 35 U.S.C. 154(b) by 29 days.

(21) Appl. No.: 16/055,462

(22) Filed: Aug. 6, 2018

(65) Prior Publication Data

US 2019/0047506 A1    Feb. 14, 2019

(30) Foreign Application Priority Data

Aug. 14, 2017  (JP) .................................. 2017-156379

(51) Int. Cl.
| | | |
|---|---|---|
| *B60R 21/36* | (2011.01) | |
| *B60R 21/2338* | (2011.01) | |
| *B60R 21/237* | (2006.01) | |
| *B60R 21/34* | (2011.01) | |

(52) U.S. Cl.
CPC .......... *B60R 21/2338* (2013.01); *B60R 21/36* (2013.01); *B60R 21/237* (2013.01); *B60R 2021/23382* (2013.01); *B60R 2021/346* (2013.01)

(58) Field of Classification Search
CPC ..... B60R 21/34; B60R 21/36; B60R 21/2338; B60R 21/237; B60R 21/231; B60R 2021/346; B60R 2021/23382
USPC .............................. 280/743.2; 180/274, 271
See application file for complete search history.

(56) References Cited

U.S. PATENT DOCUMENTS

| | | | |
|---|---|---|---|
| 9,346,432 B2 * | 5/2016 | Sugimoto | ............. B60R 21/237 |
| 2005/0206137 A1 | 9/2005 | Takimoto | |
| 2009/0014988 A1 | 1/2009 | Takimoto et al. | |
| 2009/0295137 A1 * | 12/2009 | Kim | ...................... B60R 21/233 |
| | | | 280/743.2 |
| 2010/0270775 A1 * | 10/2010 | Enders | ................... B60R 21/201 |
| | | | 280/728.2 |
| 2014/0291055 A1 * | 10/2014 | Tanaka | .................... B60R 21/36 |
| | | | 180/274 |

FOREIGN PATENT DOCUMENTS

| | | |
|---|---|---|
| JP | 2004-352218 | 12/2004 |
| JP | 2007-216938 | 8/2007 |

\* cited by examiner

*Primary Examiner* — Keith J Frisby
(74) *Attorney, Agent, or Firm* — Oblon, McClelland, Maier & Neustadt, L.L.P.

(57) ABSTRACT

An airbag includes a body portion, a tether, and a folded portion. The body portion is expanded and deployed to an outer side of a vehicle and covers a lower end portion of a windshield glass. The tether is provided inside the body portion, and connects an upper portion and a lower portion of the body portion so as to partition the body portion in the vehicle front-rear direction. Also, the tether has a through hole. The folded portion is formed by sewing the tether that is folded and overlapped.

3 Claims, 9 Drawing Sheets

FIG. 6
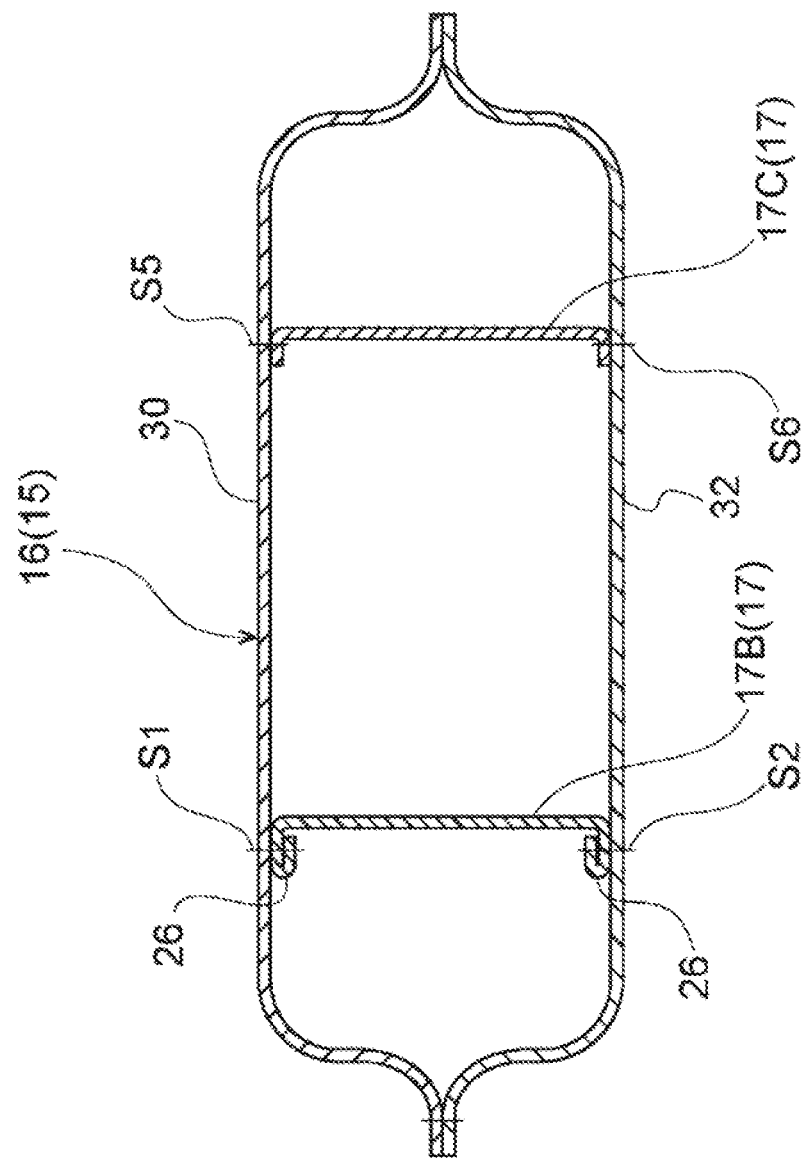
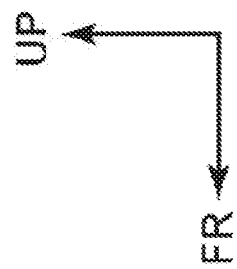

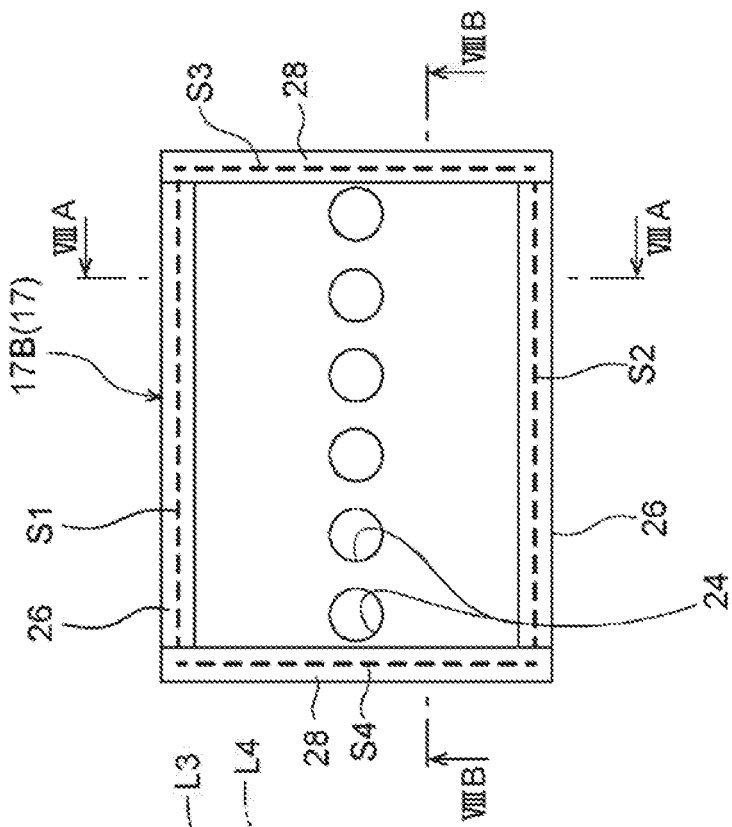
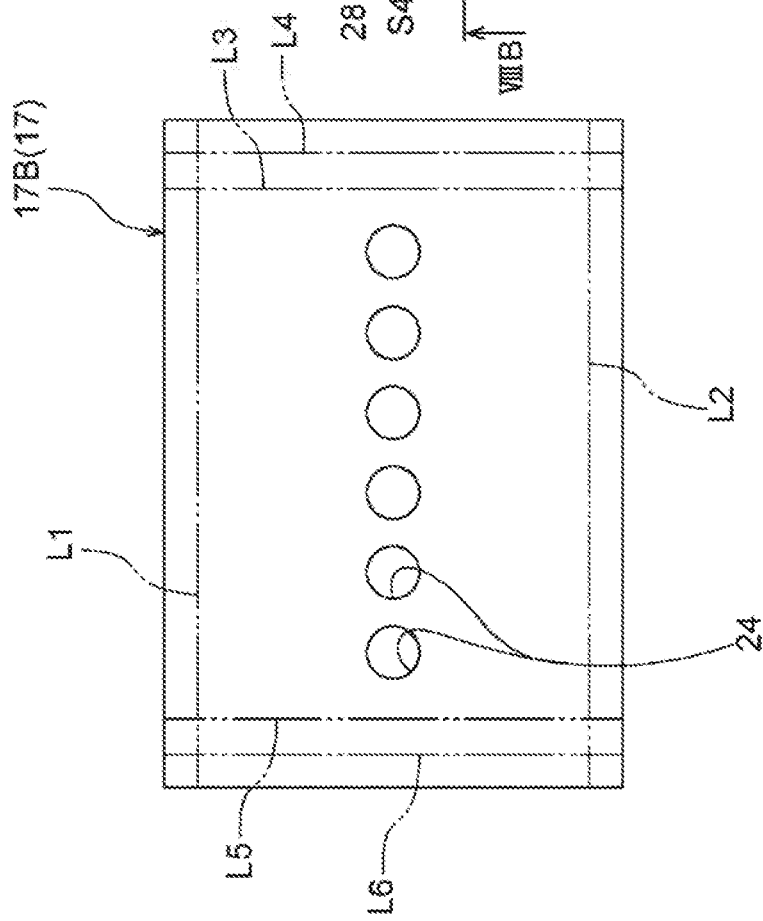

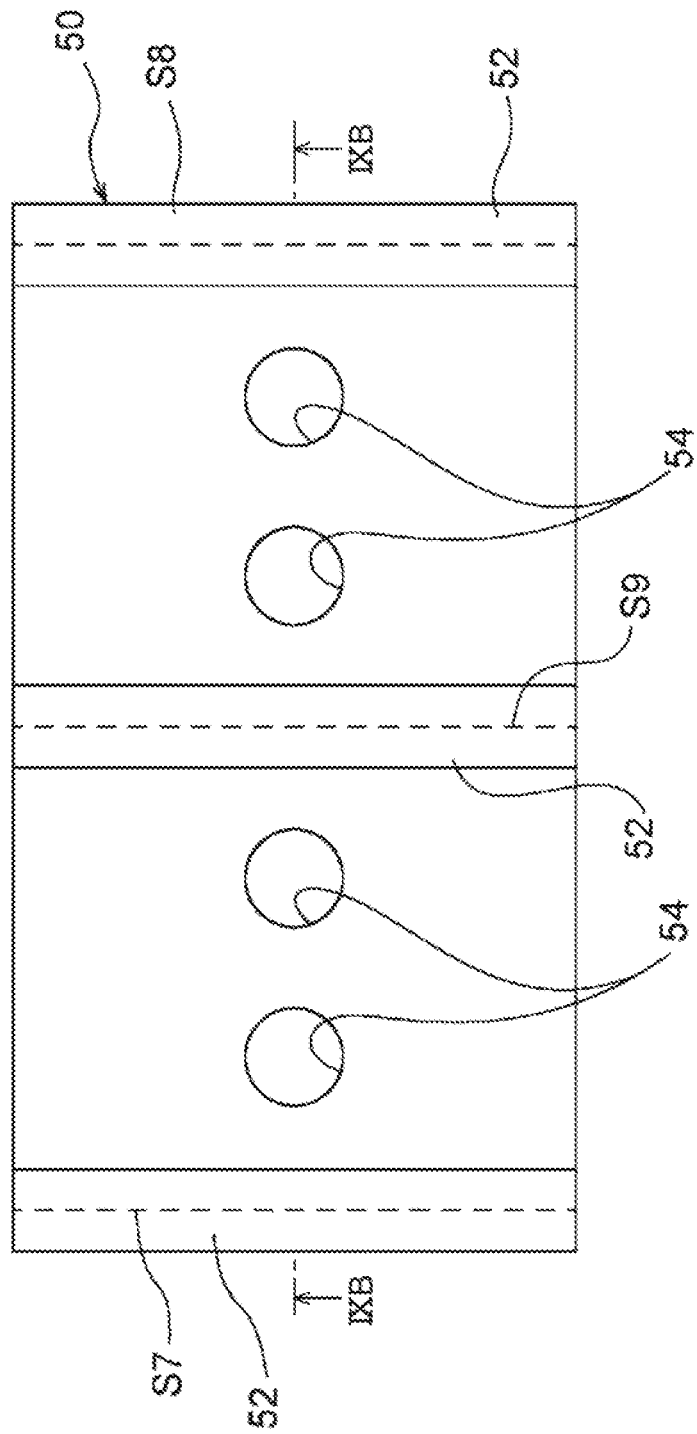
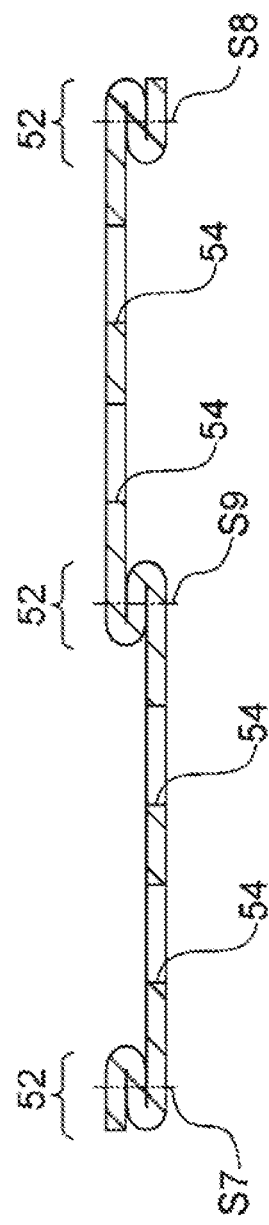

US 10,676,059 B2

AIRBAG

INCORPORATION BY REFERENCE

The disclosure of Japanese Patent Application No. 2017-156379 filed on Aug. 14, 2017 including the specification, drawings and abstract is incorporated herein by reference in its entirety.

BACKGROUND

1. Technical Field

The disclosure relates to an airbag, especially to a pedestrian protection airbag.

2. Description of Related Art

Japanese Unexamined Patent Application Publication No. 2004-352218 (JP 2004-352218 A) discloses an airbag fixed to an A-pillar as a pedestrian protection airbag that expands and deploys outside of a vehicle in order to protect a pedestrian. In the airbag, a tether (a tether panel) is provided. The tether divides an inside of the airbag into a first air chamber and a second air chamber. Also, through holes (vent holes) are formed in the tether, and the first air chamber and the second air chamber communicate with each other through the through holes.

SUMMARY

In the structure in which the tether partitions the airbag as described in JP 2004-352218 A, it is possible to adjust a shape of the airbag so that the airbag does not expand too much when the airbag expands and deploys. However, when the airbag expands and deploys, the tether is pulled upwardly and downwardly. Therefore, in the case of the tether described in JP 2004-352218 JP, since the through holes are formed, tensile strength of the tether is reduced, and the tether can break easily.

The disclosure provides an airbag having a tether in which a through hole is formed, the airbag serving as an airbag in which the tether is difficult to brake.

An aspect of the disclosure is relates to an airbag including: a body portion that is expanded and deployed to an outer side of a vehicle and covers a lower end portion of a windshield glass; a tether that is provided inside the body portion, the tether connecting an upper portion and a lower portion of the body portion and thus partitioning the body portion in a vehicle front-rear direction, the tether having a through hole; and a folded portion that is obtained by sewing the tether that is folded and overlapped.

In the airbag according to the above aspect, the bag body portion is expanded and deployed to the outer side of the vehicle due to pressure of gas generated by the inflator. Then, the bag body portion covers the lower end portion of the windshield glass. Thus, a pedestrian who collides with the vehicle is protected.

Further, the tether is provided inside the bag body portion. As the tether connects the upper and lower pieces of base fabric of the bag body portion, the bag body portion is divided in the vehicle front-rear direction. By providing the tether as described above, the bag body portion is divided into the front and the rear, and, at the same time, it is possible to adjust a shape (a thickness) of the bag body portion when the bag body portion is expanded and deployed. Further, since the through hole is formed in the tether, it is possible to allow gas to flow through the through hole efficiently.

Furthermore, the tether is provided with the folded portion that is obtained by sewing a portion of the tether that is folded and overlapped. Therefore, it is possible to increase the thickness of the tether partially, thus improving tensile strength of the tether. Hence, with the airbag according to the aspect, it is possible to restrain the tether from breaking when the bag body portion is expanded and deployed.

In the above aspect, the folded portion may include a first folded portion that is obtained by folding back the tether along a vehicle upper-lower direction as a folding line.

In the airbag according to the above aspect, it is possible to improve tensile strength of the tether especially against a tensile load applied to the tether in the vehicle upper-lower direction. Therefore, in the airbag according to the aspect, it is possible to restrain breakage of the tether even when a large tensile load is applied to the tether in the vehicle upper-lower direction.

In the above aspect, the first folded portion may be formed at least in both end portions of the tether in a vehicle width direction respectively.

In the airbag according to the above aspect, it is possible to reinforce the both end portions of the tether in the vehicle width direction. Therefore, the both end portions of the tether in the vehicle width direction that tend to be starting points of breakage are reinforced, and it is thus possible to restrain breakage of the tether more effectively.

In the above aspect, the folded portion may include a second folded portion that is obtained by folding back the tether along a vehicle width direction as a folding line. The second folded portion may be sewn on the upper portion and the lower portion of the body portion.

In the airbag according to the above aspect, it is possible to improve tensile strength of the tether especially against a tensile load applied to the tether in the vehicle width direction. Therefore, even when a large tensile load is applied to the tether in the vehicle width direction, it is possible to restrain the tether from breaking. Further, since the horizontal folded portions are sewn on the base fabric of the bag body portion, the horizontal folded portions are able to reinforce the bag body portion.

In the above aspect, the tether may have a plurality of the through holes. The folded portion may include a third folded portion that is formed between a first through hole and a second through hole being adjacent to the first through hole.

In the airbag according to the aspect, since the plurality of through holes is formed in the tether, it is possible to allow gas to flow more efficiently compared to a structure in which only one through hole is formed. Further, as the folded portion between through holes is formed between the neighboring through holes, it is possible to reinforce a portion between the neighboring through holes. Therefore, even when more than one through holes is formed in the tether, it is possible to restrain the tether from breaking.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a sectional view of the pedestrian protection airbag taken along the line VI-VI in FIG. 5;

FIG. 7A is a schematic view at the tether before the tether is folded;

FIG. 7B is a schematic view of the tether after the tether is folded;

FIG. 9A is a schematic view of a modification of the tether; and

FIG. 9B is a sectional view of the tether taken along the line IXB-IXB in FIG. 9A.

DETAILED DESCRIPTION OF EMBODIMENTS

An airbag according to an embodiment is described with reference to the drawings. An airbag according to an embodiment of the disclosure is a pedestrian protection airbag 15. As shown in each of the drawings as necessary, an arrow FR indicates a front direction of a vehicle 100, an arrow UP indicates an upward direction of the vehicle 100, and an arrow RH indicates a rightward direction of the vehicle 100. Hereinafter, in description using "front and rear" and "upper and lower" directions, the "front and rear" means the front and the rear in a vehicle front-rear direction, and the "upper and lower" means upward and downward in a vehicle upper-lower direction, unless otherwise specified, in description using a "right-left" direction, the "right and left" means the right and the left in a vehicle width direction when facing an advancing direction of the vehicle, unless otherwise specified.

Figure 4:
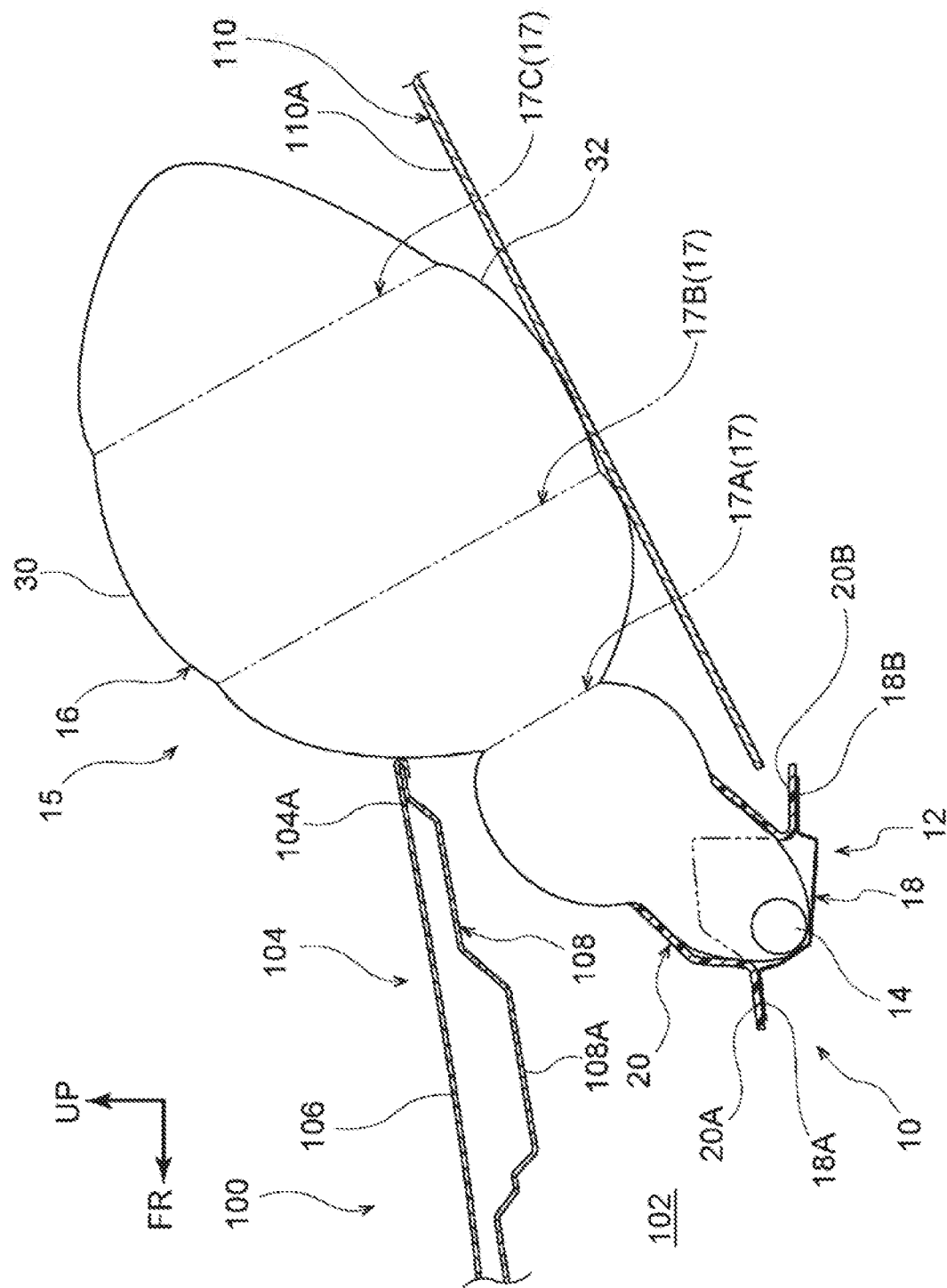
FIG. 4 is a side view of the front part of the vehicle in which the pedestrian protection airbag is installed, the view showing the operating state where the bag body portion is expanded and deployed.

As shown in FIG. 4, a hood 104 is provided above a power unit chamber 102 of the vehicle 100 in which the pedestrian protection airbag 15 according to the embodiment (hereinafter, referred to as an "airbag 15" as appropriate) is provided. A windshield glass 110 is disposed in the vehicle rear side of the hood 104. The windshield glass 110 is inclined diagonally upwardly to the vehicle rear side, and a lower end portion 110A of the windshield glass 110 is positioned on the vehicle rear side of a rear end portion 104A of the hood 104.

A front end portion of the hood 104 is normally in a locked state because of a hood lock (not shown). Further, hood hinges (not shown) are disposed on both sides of the rear end portion 104A of the hood 104 in the vehicle width direction, respectively. Each of the hood hinges includes a hinge base fixed to a vehicle body, and a hinge arm. A first end portion of the hinge arm is fixed to the hood, and a second end portion of the hinge arm is joined to the hinge base with a pin so that the hinge arm is able to swing around the joining point. Further, pop-up devices (not shown) are disposed on both sides of the rear end portion 104A of the hood 104 in the vehicle width direction, respectively. The pop-up devices lift the rear end portion 104A of the hood 104 when a collision with a pedestrian happens. FIG. 4 illustrates a state where the pop-up devices are activated and the rear end portion 104A of the hood 104 is lifted.

The hood 104 includes a hood outer panel 106 and a hood inner panel 108. The hood outer panel 106 is disposed on an outer side of a vehicle and forms a design surface. The hood inner panel 108 is disposed on the power unit chamber 102 side and reinforces the hood outer panel 106. In the hood inner panel 108, a bulging portion 108A is formed. The bulging portion 108A expands to the vehicle lower side and also extends along the vehicle width direction. The bulging portion 108A is formed at a position offset to the vehicle front side with respect to the rear end portion 104A of the hood 104. Then, an airbag device 10 is disposed on the vehicle lower side of the rear end portion 104A of the hood 104.

Overall Structure of Airbag Device

Figure 3:
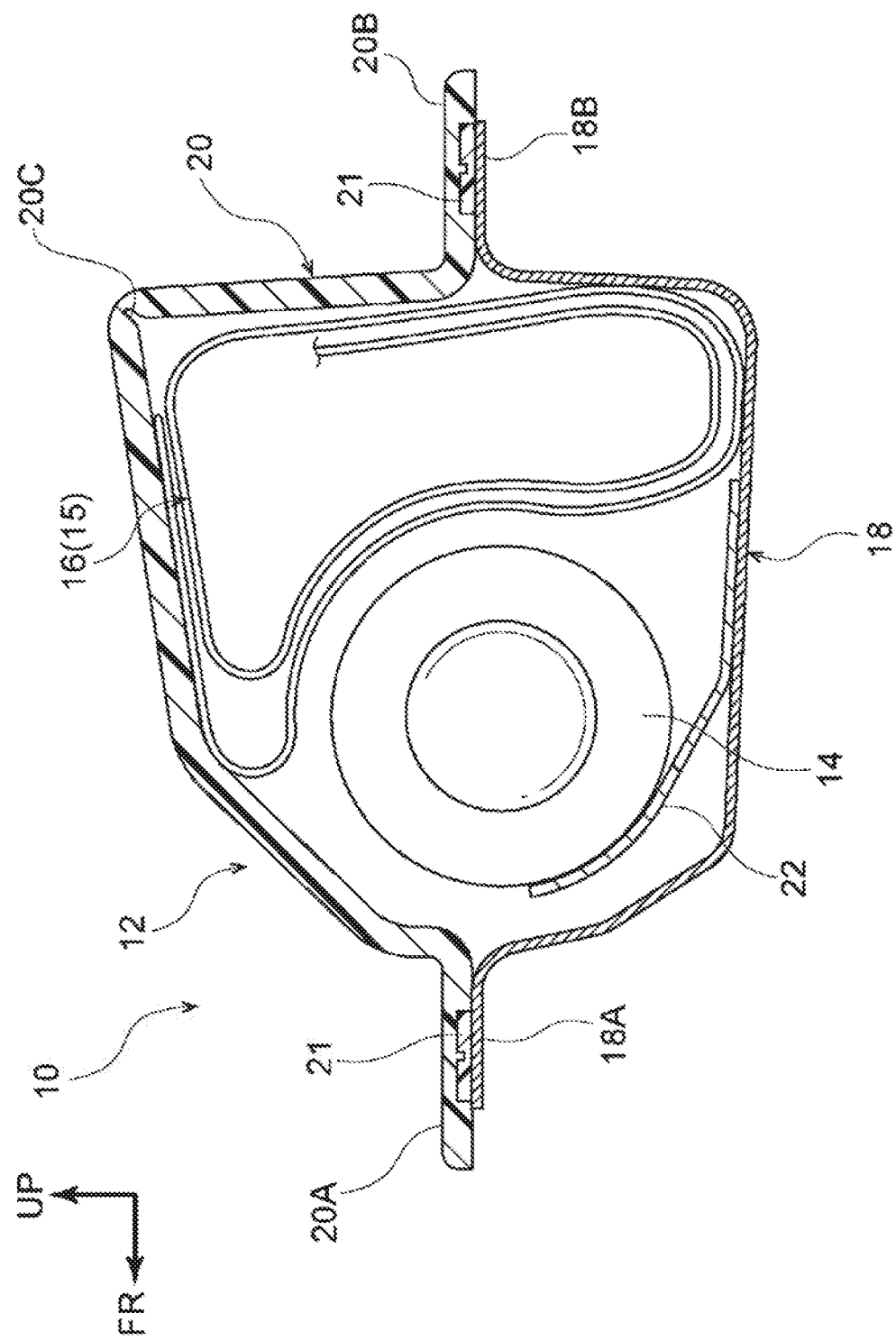
FIG. 3 is a sectional view at the pedestrian protection airbag device seen in a vehicle width direction, the view showing a non-operating state where the airbag is stored.

As shown in FIG. 3, the airbag device 10 according to the embodiment includes an airbag case 12, inflators 14, and the airbag 15.

The airbag case 12 has an generally rectangular shape in a view from the vehicle width direction, and is fixed to a cowl portion (not shown) provided below the lower end portion of the windshield glass 110. Further, the airbag case 12 includes a lower case 18 on a lower side and an upper case 20 on an upper side, and is thus formed into a hollow shape.

The lower case 18 has an generally hat-shaped section in which the upper side is open in a vehicle side view, and is made from metal such as a steel material. Also, a lower-side front flange 18A extends from a front end portion of the lower case 18 towards the vehicle front side. Meanwhile, a lower-side rear flange 18B extends from a rear end portion of the lower case 18 to the vehicle rear side.

A mounting bracket 22 is fixed to a bottom portion of the lower case 18, and the later-described inflator 14 is mounted on the mounting bracket.

The upper case 20 has an generally hat-shaped section in which a lower side is open in the vehicle side view, and is made from a resin material such as fiber-reinforced resin. Further, an upper-side front flange 20A extends from a front end portion of the upper case 20 to the vehicle front side, and an upper-side rear flange 20B extends from a rear end portion of the upper case 20 to the vehicle rear side.

A cutout portion is formed in the upper-side front flange 20A on the lower case 18 side. A seal material 21 is provided inside the cutout portion and sandwiched between the upper-side front flange 20A and the lower-side front flange 18A. A similar cutout portion is formed in the upper-side rear flange 20B on the lower case 18 side. The seal material 21 is also provided in the cutout portion and sandwiched between the upper-side rear flange 20B and the lower-side rear flange 18B. Thus, the seal material 21 seals the upper case 20 and the lower case 18.

Figure 2:
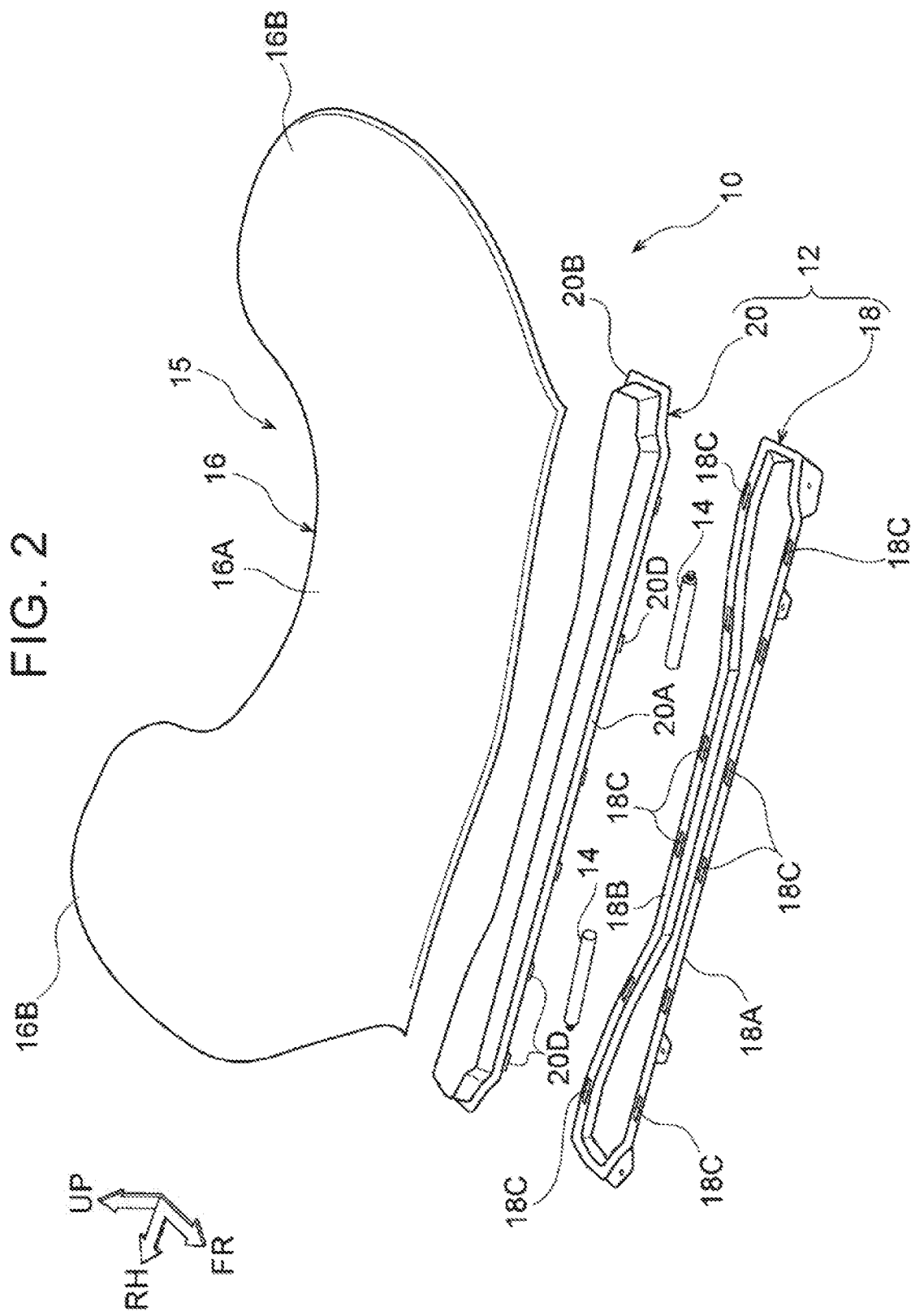
FIG. 2 is an exploded perspective view of a pedestrian protection airbag device.

As shown in FIG. 2, a plurality of engagement groove portions 18C is provided in the lower-side front flange 18A and the lower-side rear flange 18B at intervals in the vehicle width direction. Meanwhile, in the upper-side front flange 20A and the upper-side rear flange 20B of the upper case 20, engagement projecting portions 20D are formed at positions corresponding to the engagement groove portions 18C, respectively. The engagement projecting portions 20D are engaged with the engagement groove portions 18C respectively, and the airbag case 12 is thus structured. Rivets and the like may be used to join the upper case 20 and the lower case 18.

As shown in FIG. 3, a V-shaped groove is formed in an upper corner portion of the rear end portion of the upper case 20 so that a thickness of the upper corner portion is reduced, and a tear portion 20C is thus formed. Then, strength and rigidity of the tear portion 20C are lower than those of the remaining portion (a general portion) of the upper case 20. Therefore, when the airbag 15 described later starts expanding inside the airbag case 12 and a tensile load applied to the tear portion 20C increases, the tear portion 20C is configured to break.

The inflators 14 and the airbag 15 are stored inside the airbag case 12. The inflators 14 are stored in both end portions of the airbag case 12 in the vehicle width direction, respectively, and disposed so that the vehicle width direction serves as a longitudinal direction of the inflators 14 (see FIG. 1). Further, each of the initiators 14 is a so-called cylinder-type inflator, and a squib (an ignition device, not shown) is disposed in an axial core portion on an inner side of each of the inflators 14 in the vehicle width direction. Also, the inside of each of the inflators 14 is filled with a gas-generating agent that generates a large amount of gas by combustion.

A controller (an electronic control unit: ECU, not shown) is electrically connected with the inflators 14. The controller is connected with a collision detection sensor (not shown) or a collision prediction sensor (not shown) disposed in a front bumper (not shown). The front bumper is disposed in a front end portion of the vehicle 100 so that the vehicle width direction serves as the longitudinal direction of the front bumper.

Here, when the collision detection sensor or the collision prediction sensor detects or predicts a collision between the vehicle 100 and a pedestrian, the controller activates the pop-up devices, and the rear end portion 104A of the hood 104 is lifted (popped up) to a prescribed height on the vehicle upper side.

Once a lifted amount of the rear end portion 104A of the hood 104 reaches a prescribed amount, the controller activates the inflators 14. Then, gas is injected from gas injecting portions of the inflators 14 and supplied inside the airbag 15. Hence, the airbag 15 starts expanding inside the airbag case 12, and a tensile load applied to the tear portion 20C increases. Then, once the tensile load reaches a prescribed value, the tear portion 20C breaks, and the airbag case 12 is deployed so that the rear side of the airbag case 12 opens.

Examples of the collision detection sensor include those in a chamber system and an optical fiber system. In the chamber system, a long pressure tube or pressure chamber, and a pressure sensor are disposed in a front surface side of a front bumper reinforcement along the front bumper. An example of the collision prediction sensor is a pre-crash sensor that predicts a collision with a collision object such as a pedestrian by using a millimeter wave radar or a stereo camera.

Structure of Airbag

Figure 5:
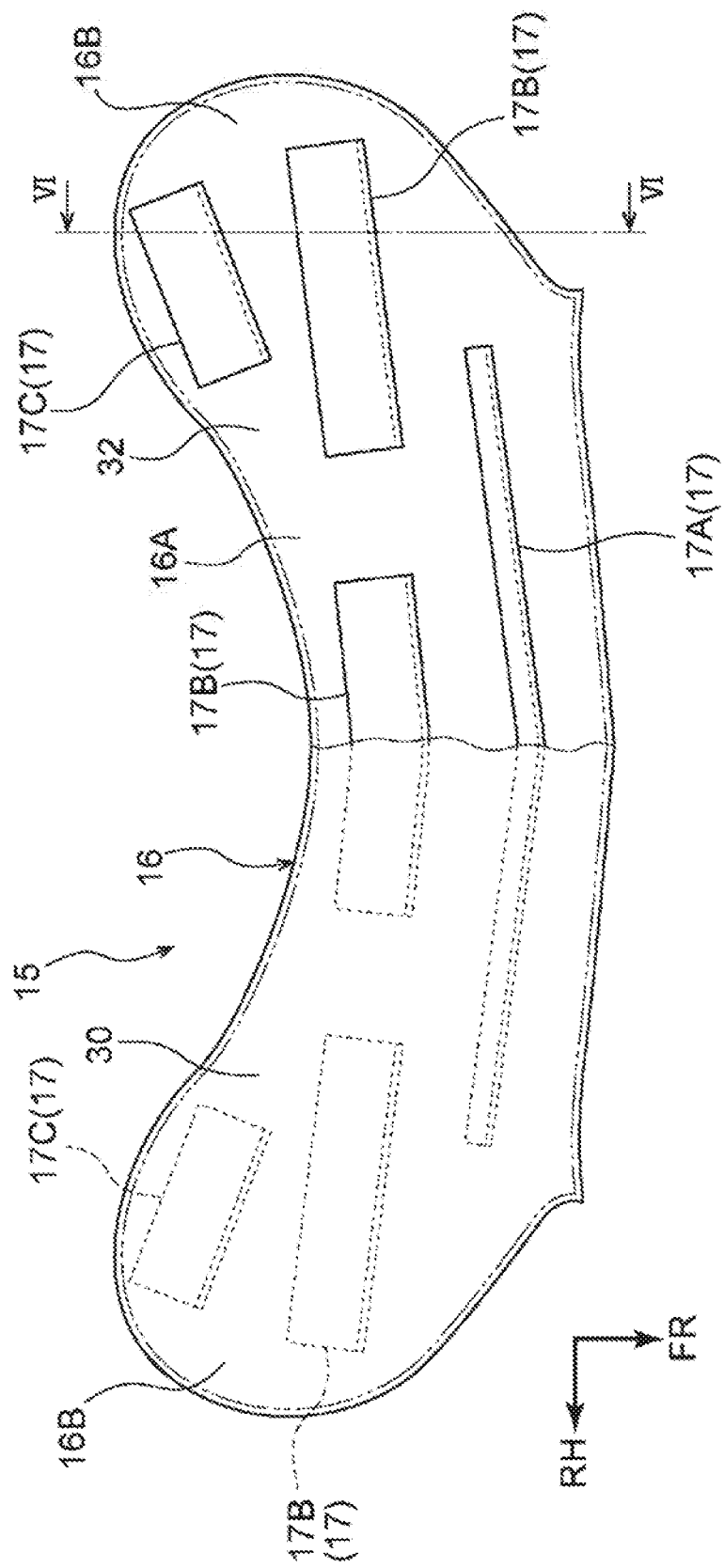
FIG. 5 is a plan view of the pedestrian protection airbag, the view describing a positional relation between the bag body portion and tethers.

As shown in FIG. 5 and FIG. 6, the airbag 15 includes a bag body portion 16 and a plurality of tethers 17. The bag body portion 16 is made into a bag shape by sewing outer peripheral portions of two pieces of base fabric 30, 32 on the upper side and the lower side. The bag body portion 16 is stored inside the airbag case 12 in a state where the bag body portion 16 is folded up in a prescribed folding method such as bellow folding and roll folding (see FIG. 3).

Figure 1:
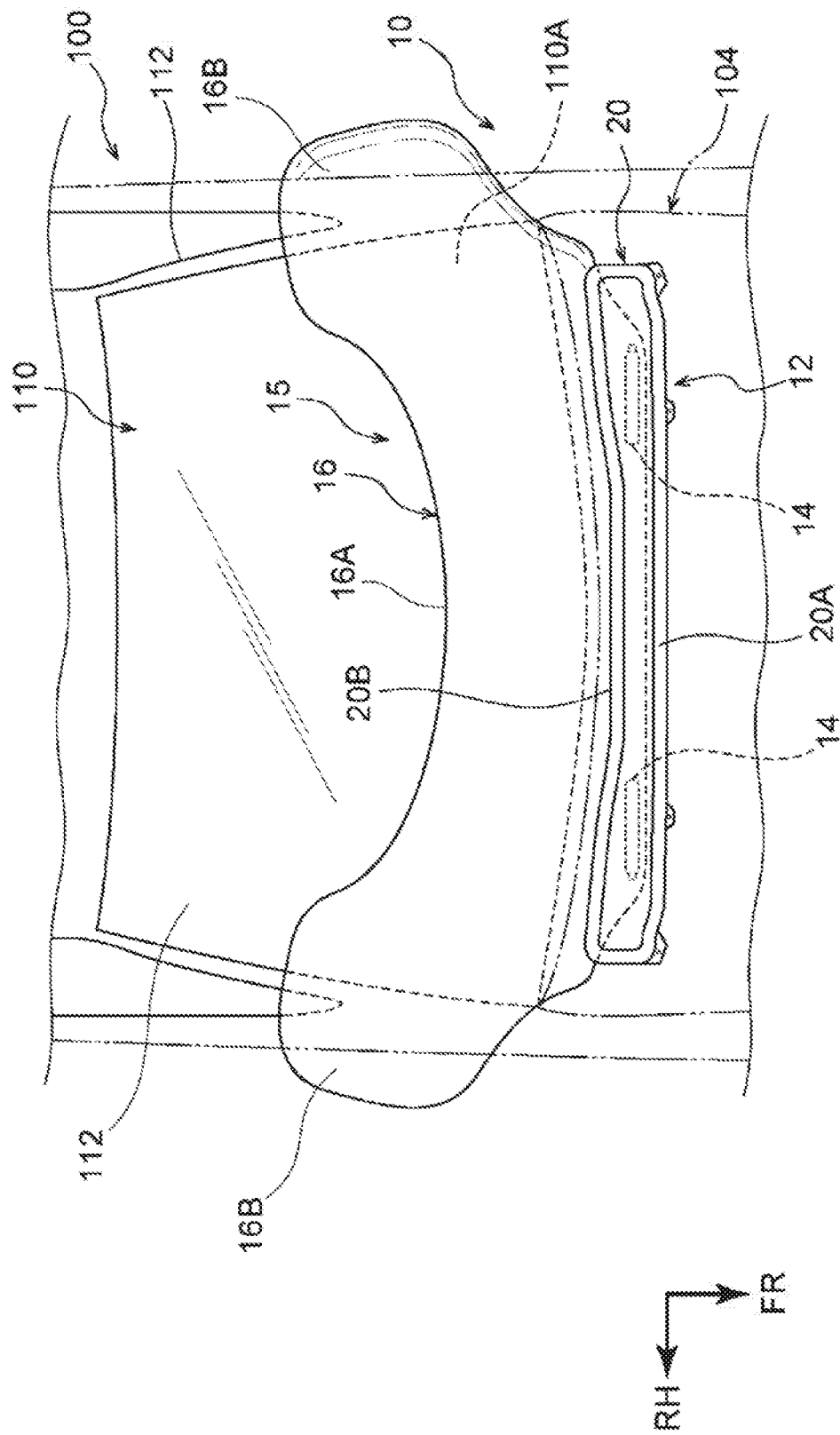
FIG. 1 is a plan view of a front part of a vehicle in which a pedestrian protection airbag is installed, the view showing an operating state where a bag body portion is expanded and deployed.

Further, the bag body portion 16 is connected with the inflators 14, and, when the inflators 14 are activated, the bag body portion 16 is configured to expand and deploy to the outer side of a vehicle due to pressure of gas generated by the inflators 14. Here, as shown in FIG. 1, the bag body portion 16 includes a center bag, portion 16A that covers the lower end portion 110A of the windshield glass 110 in the state where the bag body portion 16 is expanded and deployed.

The center bag portion 16A is expanded and deployed in the center in the vehicle width direction, and extends in the vehicle width direction in a plan view. Further, side bag portions 16B extend from both end portions of the center bag portion 16A in the vehicle width direction to the vehicle rear side, respectively. The side bag portions 16B are expanded and deployed so as to cover from surfaces of lower portions of front pillars 112.

As shown in FIG. 5, the tethers 17 are provided inside the bag body portion 16. In the embodiment, a first tether 17A, second tethers 17B, third tethers 17C are provided in this order starting from the vehicle front side. Each of the first tether 17A, the second tethers 17B, and the third tethers 17C connects the upper and lower pieces of base fabric 30, 32 of the bag body portion 16, and partitions the bag body portion 16 in the vehicle front-rear direction. FIG. 5 shows a state where the bag body portion 16 is flat before expansion, and each of the first tether 17A, the second tethers 17B, and the third tethers 17C is two-folded.

The first tether 17A is disposed in a front portion of the center bag, portion 16A, and continuously extends from a first end portion of the center bag portion 16A to a second end portion of the center bag portion 16A in the vehicle width direction. In a plan view, the first tether 17A is bent towards the vehicle front side at a center portion of the first tether 17A in the vehicle width direction. Also, from the center portion to the outer sides in the vehicle width direction, the first tether 17A is inclined towards the vehicle rear side.

The second tethers 17B are disposed on the vehicle rear side with respect to the first tether 17A, and, there are three of the second tethers 17B disposed at intervals in the vehicle width direction. The second tether 17B disposed in the center is positioned at the center of the bag body portion 16 in the vehicle width direction, and has a length that is about a third of the length of the first tether 17A. The second tethers 17B disposed so as to sandwich the central second tether 17B from both sides are disposed at positions, each of the positions crossing both the center bag portion 16A and the side bag portion 16B.

The third tethers 17C are disposed in rear portions of the side bag portions 16B on the vehicle rear sides with respect to the second tethers 17B on both sides, respectively. The third tethers 17C are shorter than the second tethers 17B in the vehicle width direction. In a plan view, each of the third tethers 17C is disposed so as to incline towards the vehicle rear side to the outer side of the third tether 17C in the vehicle width direction.

As shown in FIG. 7A and FIG. 7B, a plurality of generally circular through holes 24 is formed in each of the tethers 17. In the embodiment, the through holes 24 are formed at intervals in a width direction of the tether 17. For example, six through holes 24 are formed in the second tether 17B. Although not shown, similar through holes are formed in the first tether 17A and each of the third tethers 17C.

The second tether 17B includes a pair of upper and lower horizontal folded portions 26. Also, the second tether 17B includes a pair of right and left vertical folded portions 28.

The horizontal folded portions 26 and the vertical folded portions 28 are formed by sewing the second tether 17B that are folded and overlapped. Each of the horizontal folded portions 26 is formed by folding back the second tether 17B along the vehicle width direction that serves as a folding line. Hereinafter, the horizontal folded portions 26 and the vertical folded portions 28 are described specifically.

Figure 8B:
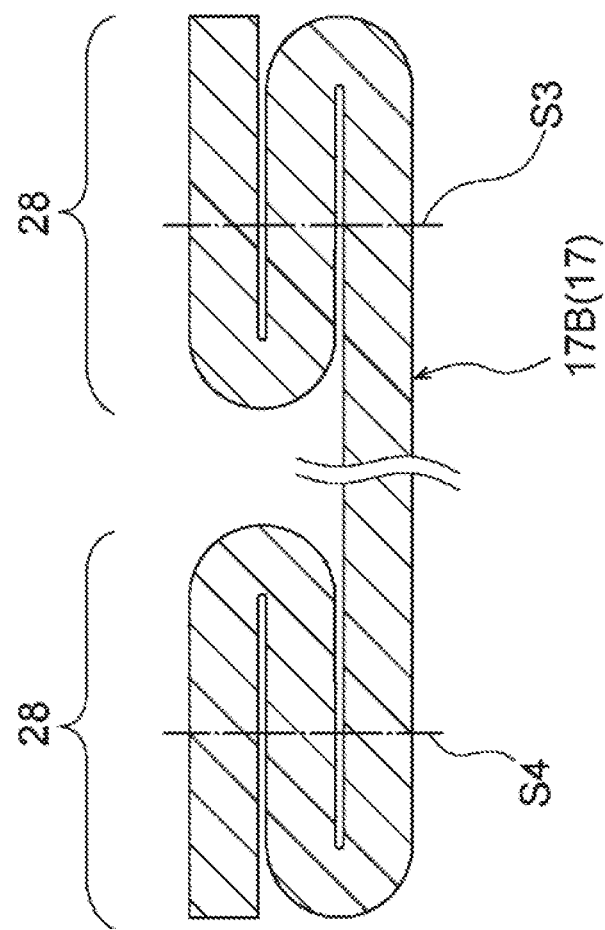
FIG. 8B is a sectional view of the tether taken along the line VIIIB-VIIIB in FIG. 7B.
Figure 8A:
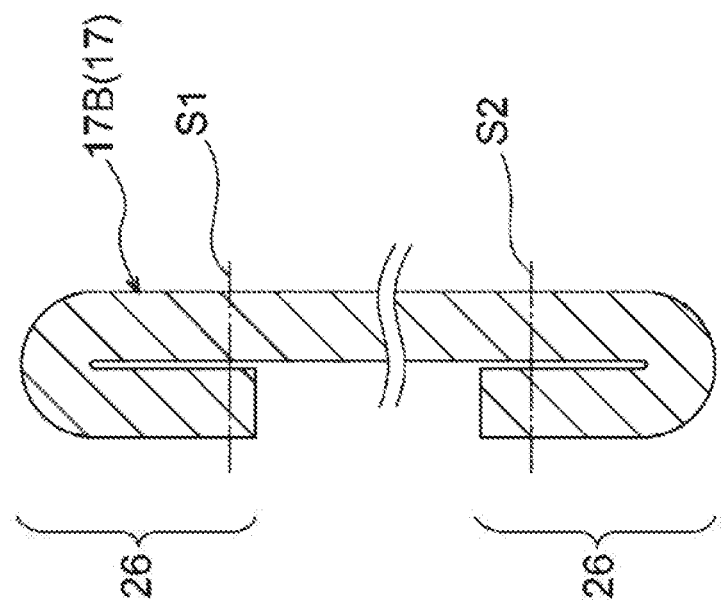
FIG. 8A is a sectional view of the tether taken along the line VIIIA-VIIIA in FIG. 7B.

As shown in FIG. 7A, in an upper end portion of the second tether 17B, a first folding line L1 is set in the vehicle width direction. The upper end portion of the second tether 17B is folded towards the center of the second tether 17B along the first folding line L1 so as to be overlapped, and then sewn in a sewn portion S1. Thus, as shown in FIG. 7B and FIG. 8A, the upper horizontal folded portion 26 is formed. Similarly, in a lower end portion of the second tether 17B, a second folding line L2 is set in the vehicle width direction. The lower end portion of the second tether 17B is folded towards the center of the second tether 17B along the second folding line L2 so as to be overlapped, and then sewn in a sewn portion S2. Thus, the lower horizontal folded portion 26 is formed.

As shown in FIG. 7A, in a first end side of the second tether 17B in the vehicle width direction, a third folding line L3 is set in the vehicle upper-lower direction, and a fourth folding line L4 is set in parallel to the third folding line L3 on the outer side of the third folding line L3. Then, a first end portion of the second tether 17B in the vehicle width direction is folded along the third folding line L3, and then folded along the fourth folding line L4 so as to be overlapped. Thereafter, the portion that is folded and overlapped is sewn in a sewn portion S3. Thus, as shown in FIG. 7B and FIG. 8B, the vertical folded portion 28 on the first end side is formed.

Similarly to the first end side, in a second end side of the second tether 17B in the vehicle width direction, a fifth folding line L5 is set in the vehicle upper-lower direction, and a sixth folding line L6 is set in parallel to the fifth folding line L5 on the outer side of the fifth folding line L5. Then, a second end portion of the second tether 17B in the vehicle width direction is folded along the fifth folding line L5, and then folded along the sixth folding line L6 so as to be overlapped, Thereafter, the portion that is folded and overlapped is sewn in a sewn portion S4. Thus, as shown in FIG. 7B and FIG. 8B, the vertical folded portion 28 on the second end side is formed.

As described so far, the horizontal folded portion 26 is folded once, and the vertical folded portion 28 is folded twice. A corner portion where the horizontal folded portion 26 and the vertical folded portion 28 overlap is sewn when the number of layers is small enough to be sewn. When the number of layers is too large to be sewn, only either the horizontal folded portion 26 or the vertical folded portion 28 is sewn. As shown in FIG. 6, the horizontal folded portions 26 are sewn on the upper and lower pieces of base fabric 30, 32 of the bag body portion 16, respectively.

On the other hand, as shown in FIG. 6, the horizontal folded portions 26 are not formed in the third tether 17C. The vertical folded portions 28 are not formed in the third tether 17C either. Therefore, an upper end portion of the third tether 17C is sewn in a sewn portion S5 in a state where the upper end portion of the third tether 17C is bent along the upper piece of base fabric 30 of the bag body portion 16. Further, a lower end portion of the third tether 17C is sewn in a sewn portion S6 in a state where the lower end portion of the third tether 17C is bent along the lower piece of base fabric 32 of the bag body portion 16.

Although not shown, the horizontal folded portions 26 and the vertical folded portions 28 similar to those of the second tether 17B are formed in the first tether 17A.

Actions and Effects

Next, actions and effects of the embodiment are described.

As shown in FIG. 1, in the airbag device 10 according to the embodiment, when the bag body portion 16 is expanded and deployed to the outer side of the vehicle due to pressure of gas generated by the inflators 14, the center bag portion 16A covers a front surface of the lower end portion 110A of the windshield glass 110. Also, the side bag portions 16B on the right and left cover at least front surfaces of the lower portions of the from pillars 112 so that a pedestrian is protected.

Further, as shown in FIG. 4, the tethers 17 are provided inside the bag body portion 16, and the tethers 17 connect the upper and lower pieces of base fabric 30, 32 of the bag body portion 16, thereby partitioning the bag body portion 16 in the vehicle front-rear direction. Thus, by providing the tethers 17, it is possible to adjust a shape (a thickness) of the bag body portion 16 when the bag body portion 16 is expanded and deployed. To be specific, the first tether 17A prevents a portion located below the hood 104 from expanding too much. Further, the second tethers 17B and the third tethers 17C prevent the center bag portion 16A and the side bag portions 16B from expanding too much. Accordingly, the tethers 17 are able to adjust the shape (the thickness) of the bag body portion 16 when the bag body portion 16 is expanded and deployed.

Further, as shown in FIG. 8A and FIG. 8B, the through holes 24 are formed in each of the tethers 17, Therefore, gas generated by the inflators 14 is allowed to flow to the vehicle rear side through the through holes 24 efficiently. In particular, as described in the embodiment, by forming more than one through holes 24 along the vehicle width direction, gas is able to flow more effectively compared to a case where only one through hole 24 is formed in the tether 17.

Here, by forming the through holes 24 in each of the tethers 17, it is possible to accelerate the expansion and the deployment of the bag body portion 16. However, the through holes 24 reduce tensile strength of the tethers 17. In the embodiment, by forming the folded portions (the horizontal folded portions 26 and the vertical folded portions 28) in each of the tethers 17, it is possible to increase a thickness of the tethers 17 partially, thus improving tensile strength of the tethers 17. As a result, it is possible to restrain the tethers 17 from breaking.

Moreover, in the embodiment, since the horizontal folded portions 26 extending in the vehicle width direction are formed, strength against a tensile load applied to each of the tethers 17 in the vehicle width direction is increased. Thus, even when a large tensile load is applied to the tethers 17 in the vehicle width direction, it is possible to restrain the tethers 17 from breaking.

Furthermore, in the embodiment, since the vertical folded portions 28 extending in the vehicle upper-lower direction are formed, it is possible to increase strength against a tensile load applied to the tethers 17 in the vehicle upper-lower direction. Thus, even when a large tensile load is applied to the tethers 17 in the vehicle upper-lower direction, it is possible to restrain the tethers 17 from breaking.

In particular, the vertical folded portions 28 according to the embodiment are formed in both end portions of each of the tethers 17 in the vehicle width direction. Therefore, the vertical folded portions 28 are able to reinforce both end portions of each of the tethers 17 in the vehicle width direction, both end portions being prone to start breaking.

In the embodiment, the vertical folded portions 28 are formed only in both end portions of each of the tethers 17 in the vehicle width direction, respectively. However, the disclosure is not limited to this. For example, a tether 50 according to a modification shown in FIG. 9A and FIG. 9B may be used.

Modification

As shown in FIG. 9A, the tether 50 according to the modification includes vertical folded portions 52 that are folded, along the vehicle upper-lower direction serving as folding lines. There are three vertical folded portions 52 in total that are provided in both end portions and a center portion of the tether 50 in the vehicle width direction, respectively.

The vertical folded portion 52 provided in a first end portion of the tether 50 in the vehicle width direction is folded twice along the folding lines (not shown) in the vehicle upper-lower direction so as to be overlapped, and then sewn in a sewn portion S7. The folding lines are set in the first end portion of the tether 50 in the vehicle width direction. Meanwhile, the vertical folded portion 52 provided in a second end portion of the tether 50 in the vehicle width direction is folded twice along folding lines (not shown) in the vehicle upper-lower direction so as to be overlapped, and then sewn in a sewn portion S8. The folding lines are set in the second end portion of the tether 50 in the vehicle width direction.

Further, the vertical folded portion 52 in the center portion of the tether 50 in the vehicle width direction is folded twice along folding lines (not shown) in the upper-lower direction so as to be overlapped, and sewn in a sewn portion S9. The folding lines are set in the center portion of the tether 50 in the vehicle width direction.

In the tether 50, four through holes 54 are formed at intervals in the vehicle width direction, and the vertical folded portion 52 in the center serves as a folded portion between through holes. The folded portion between through holes is formed between the neighboring through holes 54 so that the through holes 54 are divided into groups of two through holes 54. In the modification, the horizontal folded portions are not provided. However, the horizontal folded portions 26 may be provided similarly to FIG. 7A and FIG. 7B.

In the modification, the vertical folded portion 52 in the center is formed between the neighboring through holes 54 as the folded portion between through holes. Therefore, it is possible to reinforce a portion between the neighboring through holes 54. Thus, even when more than one through holes 54 is formed in the tether 50, it is possible to restrain the tether 50 from breaking.

Further, the vertical folded portion 52 is provided in the center portion in the vehicle width direction in addition to the vertical folded portions 52 provided in both end portions in the vehicle width direction, respectively. Therefore, when, for example, the tether 50 is long in the vehicle width direction, it is possible to restrain breakage of the tether 50 more effectively.

The pedestrian protection airbag 15 according to the embodiment and the modification is described. However, it is obvious that the disclosure is carried out in various forms without departing from the gist of the disclosure. For example, in the embodiment, the horizontal folded portions 26 and the vertical folded portions 28 are formed only in the second tether 17B. However, the disclosure is not limited to this, and a folded portion may also be formed in the third tether 17C.

It is preferred that the folded portion is provided in the tether to which a large tensile force is applied when the bag body portion 16 is expanded and deployed. For example, as shown in FIG. 5, the first tether 17A is provided at a position close to the inflators 14 and is short in length in the upper-lower direction. Therefore, a large tensile force is applied to the first tether 17A, The second tether 17B is positioned in the center portion of the bag body portion 16, and is configured to restrict the thickness of the bag body portion 16 that attempts to expand in a spheroidal state. Therefore, a large tensile force is applied to the second tether 17B. Therefore, by providing the folded portions in the first tether 17A and the second tethers 17B, it is possible to restrain breakage of the tethers more effectively.

Meanwhile, the third tethers 17C are at the rear portions of the side bag portions 16B, respectively, and long in length in the upper-lower direction. Therefore, tensile force applied to the third tethers 17C is smaller than that applied to the rest of the tethers. Therefore, the third tethers 17C are unlikely to break. Therefore, when a tether is unlikely to break, it is not necessary to form the folded portion on the tether in consideration of easy storage and so on.

In the embodiment, as shown in FIG. 7B, the horizontal folded portions 26 are provided in the upper end portion and the lower end portion of the tether 17, respectively, and the vertical folded portions 28 are provided in both end portions of the tether 17 in the vehicle width direction, respectively. However, the disclosure is not limited to this. For example, the horizontal folded portion 26 may be provided only in the upper end portion or the lower end portion of the tether 17. Also, the vertical folded portion 28 may be provided only in a first end portion or a second end portion of the tether 17 in the vehicle width direction. Further, the vertical folded portion 28 may be provided only in the center portion of the tether 17 in the vehicle width direction. This means that the positions and number of the folded portions are not limited.

Further, in the embodiment, the through holes 24 are formed in the tether 17 at intervals in the vehicle width direction. However, the disclosure is not limited to this. For example, the through holes 24 may be formed in the vehicle upper-lower direction. In this case, a horizontal folded portion may be provided between the upper and lower through holes 24. The horizontal folded portion serves as the folded portion between through holes. The folded portion between through holes is provided between the through holes 24.

Furthermore, in the embodiment, the upper and lower horizontal folded portions 26 are formed in the tether 17 first, and then the right and left vertical folded portions 28 are formed. However, the order may be reversed. For example, the right and left vertical folded portions 28 may be formed in the tether 17 first, and thereafter, the upper and lower horizontal folded portions 26 may be formed.

A folding direction of the tether 17 is not particularly limited. The horizontal folded portions 26 may be folded in different directions from each other, and the vertical folded portions 28 may be folded in different directions from each other. Further, the folding lines are not limited to the upper-lower direction and the right-left direction of the tether 17, and the folding lines may be set diagonally. By setting the folding line diagonally with respect to the upper-lower direction and the right-left direction of the tether 17, forming only one folded portion is enough to improve strength of the tether 17 against tensile loads in the front-rear, right-left, and upper-lower directions.

What is claimed is:
1. An airbag comprising:
a body portion that is expanded and deployed to an outer side of a vehicle and covers a lower end portion of a windshield glass;

a tether that is provided inside the body portion, the tether connecting an upper portion and a lower portion of the body portion and thus partitioning the body portion in a vehicle front-rear direction, the tether having a through hole;

a first horizontal folded portion that is obtained by folding an upper end portion of the tether toward a center of the tether along a first folding line set in a vehicle width direction so as to be overlapped and then sewn in a first sewn position;

a second horizontal folded portion that is obtained by folding a lower end portion of the tether toward the center of the tether along a second folding line set in the vehicle width direction so as to be overlapped and then sewn in a second sewn position;

a third vertical folded portion that is obtained by folding a first end side of the tether in the vehicle width direction along a third folding line set in a vehicle upper-lower direction and then folding along a fourth folding line parallel to the third folding line on an outer side of the third folding line so as to be overlapped and then sewn in a third sewn position; and a fourth vertical folded portion that is obtained by folding a second end side of the tether in the vehicle width direction along a fifth folding line set in the vehicle upper-lower direction and then folding along a sixth folding line parallel to the fifth folding line on an outer side of the fifth folding line so as to be overlapped and then sewn in a fourth sewn position.

2. The airbag according to claim 1, wherein:
the tether has a plurality of the through holes.

3. The airbag according to claim 2, further comprising a fifth vertical folded portion that is formed between a first through hole of the plurality of the through holes and a second through hole of the plurality of the through holes being adjacent to the first through hole of the plurality of the through holes.

* * * * *